Sept. 15, 1936.                H. B. BRADSHAW                2,054,190
                                   SCALE
                             Filed Feb. 19, 1931           3 Sheets-Sheet 1
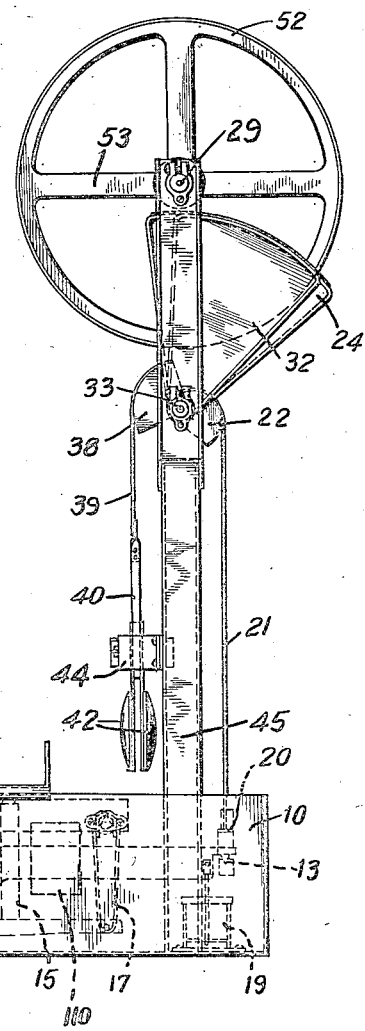
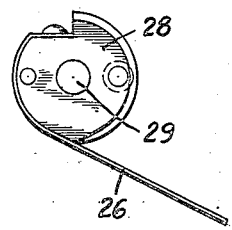
INVENTOR
Herbert B. Bradshaw
BY ATTORNEY Sept. 15, 1936.  H. B. BRADSHAW  2,054,190
SCALE
Filed Feb. 19, 1931   3 Sheets-Sheet 3

INVENTOR
Herbert B. Bradshaw
BY ATTORNEY
W. M. Wilson

Patented Sept. 15, 1936

2,054,190

UNITED STATES PATENT OFFICE 2,054,190

SCALE

Herbert B. Bradshaw, Zanesville, Ohio, assignor, by mesne assignments, to The Hobart Manufacturing Company, Troy, Ohio, a corporation of Ohio Application February 19, 1931, Serial No. 516,928

6 Claims. (Cl. 265—37)

This case relates to weighing scales and particularly to the indicator driving and load counterbalancing portions of the scale.

The object of the invention is to provide a novel means for driving an indicator.

More specifically it is the object of the invention to drive an indicator shaft without the employment of toothed members and by means associated with the counterbalancing mechanism to maintain a positive two-way driving connection for the indicator shaft.

Further the object of the invention is to provide a tape drive for an indicator shaft comprising separate elements, each for positively driving the indicator shaft in a different direction.

Another object of the invention is to provide a counterbalancing mechanism consisting of a pair of pendulums on spaced axes having offset portions permitting the pendulums to cross each other.

Still further an object of the invention is to provide counterbalancing mechanism consisting of a pair of counterbalancing elements each separately connected to a driving shaft in turn connected to the indicator shaft.

Various other objects and advantages of my invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 1 is a side section through the machine.

Fig. 5 is a detail of the tape carrying hub of the indicator shaft.

Figure 2:
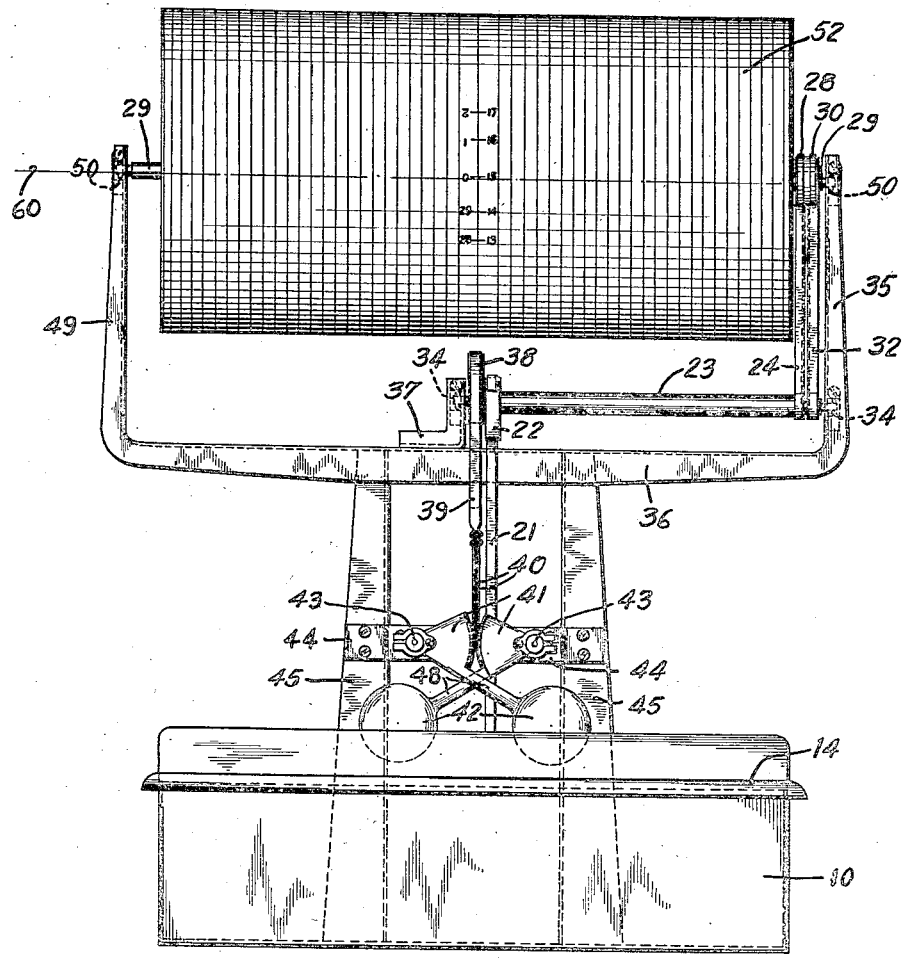
Fig. 2 is a front view of the machine with parts in section.
Figure 3:
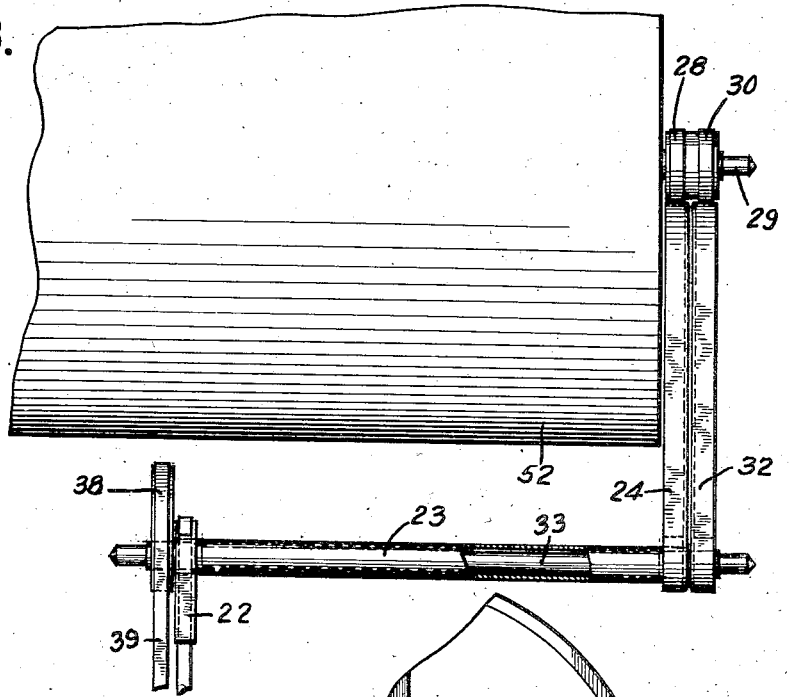
Fig. 3 is a detail of the driving mechanism for the indicator.
Figure 4:
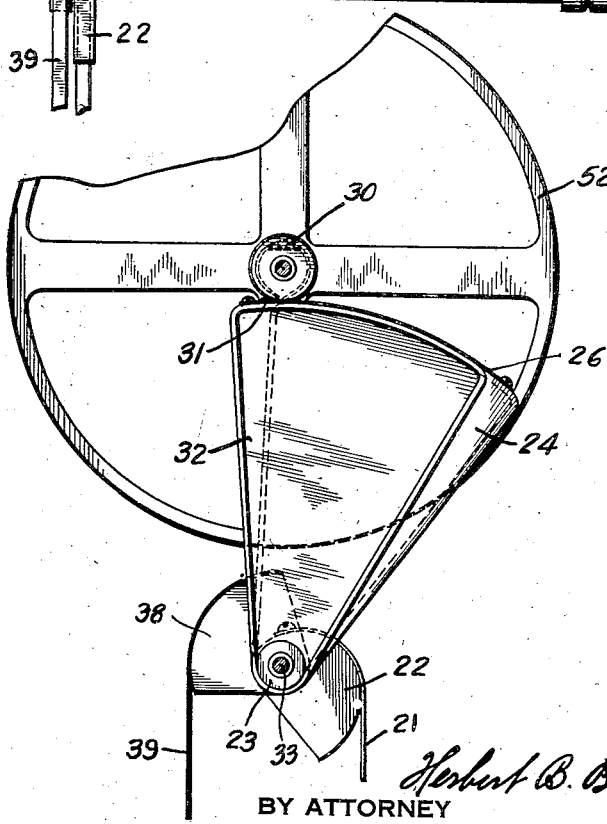
Fig. 4 is a view at right angles to Fig. 3.

In detail the scale comprises a base housing 10 for the base lever system consisting of main lever 11 and auxiliary lever 12 both of the first order. The nose iron 13 of the main lever moves upwardly upon the application of a load to the platform 14. The platform is supported on rods 15 secured to a spider 16 which is connected by links 17 to the main and auxiliary levers which are in turn connected to each other by a link 18. The dash pot 19 is connected to the outer end of the main lever 11 to dampen the oscillations of the movable parts of the scale. The nose iron 13 rests on a stirrup 20 to which is attached a tape 21 fastened at its upper end to a cam 22 fast to one end of a hollow shaft 23. At the other end the hollow shaft rigidly carries a segmental member 24 to the right hand periphery of which is secured a tape 26 which is flush on the periphery of the segmental member and has its other end wound around and secured to the hub member 28 fast to the indicator shaft 29.

At the side of the hub 28 shaft 29 rigidly carries a similar hub 30 to which is secured the ribbon tape 31 fastened to the periphery of a segmental member 32 rigidly carried by a shaft 33 passing through the hollow shaft 23 and supported at each end in bearings 34, the right hand bearing being carried by the arm 35 of a U-shaped channel beam 36. The left hand bearing is carried by a frame piece 37 attached to the U-shaped member 36. At the side of cam 22 shaft 33 carries an arc-shaped segment 38 to which is secured a ribbon tape 39, the lower end of which carries a pair of tapes 40 side by side and in a plane at right angles to the plane of ribbon 39. The lower end of each tape 40 is connected to the arc-shaped hub 41 of a pendulum 42. Pendulum hubs 41 are clamped to shafts 43 journaled in a frame bar 44 fastened to vertical standards 45 the upper ends of which fit within the channel of the frame member 36 and support said frame member. As appears from the drawings, shafts 43 of the pendulums are at right angles to the shafts 23—33 and therefore the pendulums swing at right angles to the latter shafts and in the direction of width of base housing 10. The width of the housing 10 is less than its length and for the same out of level conditions, the scale will be tilted a greater angle on its width than on its length. As is well-known, double pendulums compensate to some degree for tilting of the scale in the direction in which the pendulums swing and should therefore swing in the direction where the angle of tilt is greatest, which in most scales is in the direction of width. For this reason, the pendulums 42 are mounted at right angles to the shafts 23—33 to swing in the direction of width of the base housing and thereby provide the maximum compensation for out of level conditions of the scale.

The peripheries of the pendulum segments 41 confront each other on their flanges formed of sheet metal segments. The pendulum bobs 42 are connected to the segments by arms 48 which are in different but parallel planes and cross each other. The uprights 49 and 35 of the U-shaped member 36 are provided at their upper ends with bearings 50 in which is journaled the indicator shaft 29. The indicator 52 is a chart of the so-called drum type consisting of a cylinder carried on spiders 53 fast to the shaft 29. The cam 22 is shaped to compensate for the eccentric movement of the pendulums during the weighing operation. In this manner the movement of the indicator chart is made uniform for equal increments of load on the platform.

The present scale operates on the principle of the descending pendulum type. For the theory of operation of such scales, reference may be had to Patents 856,998, 902,953, and 1,074,421, among others. In the present case, the resultant gravitational force of the platform, main lever 11, nose end weight 110 of lever 11, auxiliary lever 12, tape 21, cam member 22 and segment 24 is such that it tends to pull down on tape 21 tending to rotate cam 22, shaft 23 and segment 24 clockwise as viewed in Fig. 1. The tape 26 carried by the segment 24 thereby tends to rotate the indicator shaft 29 counterclockwise as viewed in said figure. Pendulums 42 in their outermost position act on tapes 39 and 40 to rotate the segment 38 and shaft 33 counterclockwise as viewed in Fig. 1. The tape 31 carried by the segment 32 connected to shaft 33 thereby tends to rotate indicator shaft 29 clockwise. Since tape 26 is acted on by the force of the pendulum system tending to positively move it in one direction and hold it taut while tape 31 is acted on by the force of the base lever system tending to positively pull it in an opposite direction and maintain it taut, the both tapes will remain taut under all conditions and at all times. Were both tapes 26 and 31 connected to the same arm or were arms 24 and 32 to be rigidly connected, then there would be no force acting on one or the other of the tapes to maintain it taut. By using the separate connections to the two tapes with the counterbalancing system positively pulling on one tape and the base lever system positively pulling on the other tape, there is always a force exerted, even when the scale is in balance, to positively maintain both tapes taut. The principles of this construction are applicable to other indicator drives than tapes for positively and without play driving an indicator accurately in correspondence to the load. When there is no load on the platform the pendulums in their outermost position are effective through their connections to the shaft 29 to exactly counterbalance the resultant gravitational force of the platform and the base lever system and connected parts tending to rotate the shaft in a counterclockwise direction as viewed in Fig. 1.

When a load is placed on the platform the nose iron 13 of the main lever 11 moves upwardly thus permitting pendulums 42 to counterbalance the resultant gravitational force of the load on the platform and of the platform and connected parts in a lower position. The descent of the pendulums causes rotation of the shaft 33 to move the segment 32 counterclockwise and thereby rotate through tape connection 31 shaft 29 in a clockwise direction to give an indication of the movement of the pendulums and thereby the weight of the object on the platform. By using the descending pendulums the sudden application of a load on the platform merely relieves the tension in tape 21 and the tension in the other tapes 39 and 40 so that the sudden shock cannot be transmitted to the bearings or the pendulum parts and their connected elements as is the case when the pendulums are of the ascending type.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims:

I claim:

1. In combination in a scale, a tape drive for an indicator shaft comprising a pair of members each connected to the indicator shaft by a tape, and a pair of nested shafts, each carrying one of said members, means connected to one of said nested shafts for positively moving it to positively operate the indicator shaft in one direction, and means connected to the other nested shaft for positively moving it to positively rock the indicator shaft in the opposite direction.

2. In a scale, a pair of nested members, an indicator, and driving connections between the nested members and indicator including arms, one on each member connected to the indicator, counterbalance means connected to one member, and load responsive means connected to the other member.

3. In a scale, an indicator, a pair of shafts, and driving connections between said shafts and the indicator including an arm on each shaft connected to the indicator for operating the latter, segments one on each shaft, counterbalancing means, connections from one segment to the counterbalancing means, load responsive means, and connections from the latter to the other segment.

4. In a scale, a platform, a base lever system carrying the platform, a base frame carrying the lever system, a T-shaped frame rigidly secured relative to the base frame, the leg of the T-frame comprising an intermediate comparatively narrow column and the head of the T-frame comprising a comparatively wide horizontal bar having vertical portions at each end, a pendulum system carried by the leg of the T-frame, a drum chart and shaft mounted between the vertical portions at the ends of the T-frame head, an upright vertical bracket secured to said bar and below the chart, a rockable device rotatably mounted by and between the bracket and one of said vertical portions to extend parallel to the chart axis, connections between said device and the chart and the pendulum system for operating the latter system and the chart, and an operating connection between the base lever system and said device extending through said column.

5. In a scale, a load support and lever system operated by the support, counterbalancing means, an indicator, a carrying shaft therefor, a hub on said shaft, tape connections secured to said hub, means connecting the lever system to one of the tape connections to positively move the indicator in only one direction, and means connecting the counterbalancing means to the other of said tape connections to positively move the indicator in a direction opposite to aforesaid including a rockable member intermediate the indicator hub and counterbalancing means and a tape connection extending between and fastened to the rockable member and the counterbalancing means.

6. In a scale, a pair of nested members, an indicator, a driving connection between one said member and the indicator, another driving connection between the other said member and the indicator, counterbalancing means connected to one said member to cause it to positively drive the indicator in one direction, and load transmitting means connected to the other said member to cause the latter to positively drive the indicator in the reverse direction.

HERBERT B. BRADSHAW.